(12) United States Patent
Maeda et al.

(10) Patent No.: US 7,128,994 B2
(45) Date of Patent: Oct. 31, 2006

(54) POLYELECTROLYTE TYPE FUEL CELL AND SEPARATOR FOR POLYELECTROLYTE TYPE FUEL CELL

(75) Inventors: Takanori Maeda, Tokyo (JP); Hiroshi Yagi, Tokyo (JP)

(73) Assignee: Dai Nippon Insatsu Kabushiki Kaisha, Tokyo (JP)

( * ) Notice: Subject to any disclaimer, the term of this patent is extended or adjusted under 35 U.S.C. 154(b) by 344 days.

(21) Appl. No.: 10/468,392

(22) PCT Filed: Dec. 26, 2002

(86) PCT No.: PCT/JP02/13588

§ 371 (c)(1),
(2), (4) Date: Aug. 28, 2003

(87) PCT Pub. No.: WO03/058738

PCT Pub. Date: Jul. 17, 2003

(65) Prior Publication Data

US 2004/0086762 A1    May 6, 2004

(30) Foreign Application Priority Data

Dec. 28, 2001  (JP)  ............................. 2001-399862
Dec. 28, 2001  (JP)  ............................. 2001-399963

(51) Int. Cl.
*H01M 8/10*  (2006.01)
*H01M 8/24*  (2006.01)

(52) U.S. Cl. .......................................... 429/32; 429/18
(58) Field of Classification Search .................. 429/32, 429/34, 18, 149, 152, 158
See application file for complete search history.

(56) References Cited

FOREIGN PATENT DOCUMENTS

| JP | 5-41221 | | 2/1993 |
|---|---|---|---|
| JP | 5-041221 | * | 2/1993 |
| JP | 2000-353533 | | 12/2000 |
| WO | 98/50973 | | 11/1998 |
| WO | 00/69011 | | 11/2000 |

* cited by examiner

*Primary Examiner*—Patrick Joseph Ryan
*Assistant Examiner*—Thomas H. Parsons
(74) *Attorney, Agent, or Firm*—Oblon, Spivak, McClelland, Maier & Neustadt, P.C.

(57) ABSTRACT

In a polymer electrolyte fuel cell wherein a plurality of unit cells are arranged in a flat manner oriented in the same direction, and the prescribed adjacent unit cells are electrically connected in series so as to connect the plurality of unit cells in series, a flat-type polymer electrolyte fuel cell is made possible by providing at least one of a through hole connecting portion, a filled via connecting portion and a bump connecting portion in an insulating portion located between the prescribed adjacent unit cells, electrically insulated from the unit cells and having a thickness approximately equal to that of the unit cell, for establishing electrical connection between the prescribed adjacent unit cells.

5 Claims, 17 Drawing Sheets

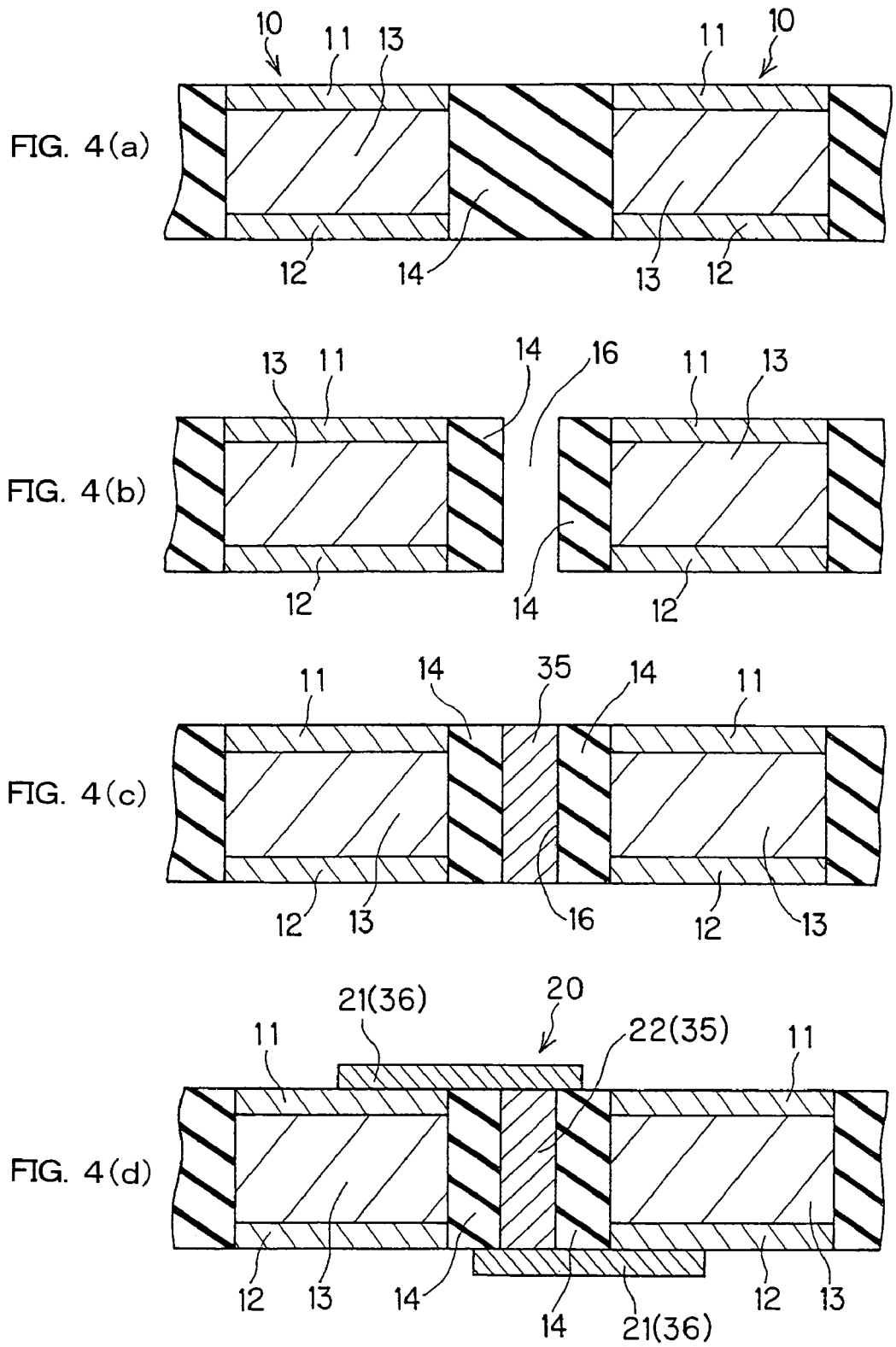

POLYELECTROLYTE TYPE FUEL CELL AND SEPARATOR FOR POLYELECTROLYTE TYPE FUEL CELL

TECHNICAL FIELD

The present invention relates to a polymer electrolyte fuel cell wherein a plurality of unit cells are arranged in a flat manner with the respective cells oriented in the same direction, and the prescribed adjacent unit cells are electrically connected to each other so as to connect the foregoing plurality of unit cells in series. Further, the present invention relates to a separator for a polymer electrolyte fuel cell of a direct methanol type in which a methanol aqueous solution is directly used as fuel, and of a flat type.

BACKGROUND ART

Recently, expectations for fuel cells have been rapidly increasing from the aspect of the global environmental protection and in view of the fact that it is advantageous to directly use hydrogen as fuel such that the energy conversion efficiency is high, and so forth.

Heretofore, the fuel cells have been utilized in the space development and the ocean development. Recently, however, the fuel cells have been extended to power sources replacing automobile engines, and household generators, so that possibilities of them to be widely used have been increased.

In short, the fuel cell is a device wherein fuel (reducing agent) and oxygen or air (oxidizing agent) are continuously supplied from the exterior to be reacted electrochemically, thereby to produce electrical energy. The fuel cells may be classified based on their operating temperatures, kinds of using fuel, applications and so forth. Recently, however, in general, they are roughly classified into five kinds, i.e. a solid oxide fuel cell (SOFC), a molten carbonate fuel cell (MCFC), a phosphoric acid fuel cell (PAFC), a polymer electrolyte fuel cell (PEFC) and an alkaline aqueous solution fuel cell (AFC), mainly depending on kinds of using electrolytes.

These fuel cells are of the type using hydrogen gas produced from methane etc. as fuel. Recently, there is also known a direct methanol fuel cell (DMFC) wherein a methanol aqueous solution is directly used as fuel.

Among such fuel cells, attention has been paid to the solid polymer fuel cell (hereinafter also referred to as the polymer electrolyte fuel cell: PEFC) having a structure wherein a solid polymer film is sandwiched between two kinds of electrodes, and further, these members are sandwiched between separators.

This PEFC is configured such that a unit cell is formed by disposing electrodes, such as an air electrode (oxygen electrode) and a fuel electrode (hydrogen electrode), on both sides of a solid polymer film, and this unit cell is sandwiched on both sides thereof between separators for the fuel cell.

For example, as the structure of the PEFC, there can be cited a structure wherein a fuel electrode and an air electrode each in the form of a catalyst layer having a thickness of 10 im to 20 im are formed on both sides of a polymer electrolyte having a thickness of 20 im to 70 im and they are unified together, then porous support layers (carbon paper, porosity: about 80%) are attached as collecting members on the outer sides of the catalyst layers, and further, they are sandwiched between separators (partition plates) each serving also as a feed passage for reaction gas such as hydrogen or oxygen.

In the foregoing PEFC, the fuel (hydrogen) and the oxidant (air) are isolated so as not to directly react with each other, and further, it is necessary to convey hydrogen ions (protons) produced at the fuel electrode to the side of the air electrode.

In the fuel cell that operates at an ordinary temperature (100° C. or lower) and wherein protons move in the solid polymer film, a thin film (thickness: about 50 im) having a perfluorocarbon sulfonic acid structure having a sulfonic group as an ion exchange group can be used as the solid polymer film, so that a compact cell can be produced.

In the foregoing PEFC, as its output performance, the high output density of 1–3 A/cm$^2$, 0.6–2.1 V/unit cell and 2.1 W/cm$^2$ can be obtained.

In general, this PEFC is in the form of a stack structure (also called a PEFC stack) wherein its electromotive force is increased to fit the purpose by stacking a plurality of unit cells each having electrodes arranged on both sides of a solid polymer film. However, like a fuel cell for a portable terminal, for example, there are also those instances where an electromotive force is not required so much, but it is required to be of the flat type and as thin as possible.

On the other hand, in general, the PEFC stack uses a separator having a structure wherein one side thereof is formed with a fuel gas feed groove for feeding fuel gas to one of adjacent unit cells, while the other side thereof is formed with an oxidant gas feed groove for feeding oxidant gas to the other of the adjacent unit cells. By this, fuel gas and oxidant gas are supplied along the separator surfaces.

As the PEFC separators, there are known a separator obtained by planing a graphite board and applying a grooving process thereto, a molded separator of a carbon compound obtained by kneading carbon into resin, a metal separator applied with a grooving process by etching or the like, a separator wherein the surface of a metal material is coated with anticorrosive resin, and so forth. These separators are each formed with a fuel gas feed groove and/or an oxidant gas feed groove according to requirements.

However, in case of the direct methanol fuel cell (DMFC) wherein a methanol aqueous solution is directly used as fuel, there has been raised a problem that the feeding of fuel by the foregoing conventional separator having the fuel gas feed groove for feeding fuel gas becomes uneven depending on places.

Particularly, it has been problematic in case of the direct methanol type with the flat type wherein a plurality of unit cells are arranged in a flat manner and electrically connected in series.

As described above, in recent years, the possibility has been increased for the fuel cells to be widely used and, in case of the PEFC, in addition to the general stack structure, there has also been required such one wherein the electromotive force is not required so much, but that is of the flat type and as thin as possible. Further, in case of the direct methanol-type and flat-type PEFC, the problem of uneven fuel feeding depending on places can not be sufficiently solved and its countermeasure has been sought for.

DISCLOSURE OF THE INVENTION

Therefore, it is an object of the present invention to provide a fuel cell having a structure wherein unit cells arranged in a flat manner are electrically connected in series.

Further, particularly, the present invention provides a direct methanol-type and flat-type PEFC that can solve the problem of uneven fuel feeding depending on places.

For accomplishing the foregoing objects, a polymer electrolyte fuel cell of the present invention is configured that, in a polymer electrolyte fuel cell wherein a plurality of unit cells are arranged in a flat manner oriented in the same direction, and the prescribed adjacent unit cells are electrically connected in series so as to connect the plurality of unit cells in series, at least one of a through hole connecting portion, a filled via connecting portion and a bump connecting portion is provided in an insulating portion located between the prescribed adjacent unit cells, electrically insulated from the unit cells and having a thickness approximately equal to that of the unit cell, for establishing electrical connection between the prescribed adjacent unit cells.

Further, a polymer electrolyte fuel cell of the present invention is configured that, in a polymer electrolyte fuel cell wherein part of one plate-like polymer electrolyte film is used as an electrolyte film forming each of a plurality of unit cells, the plurality of unit cells are arranged in a flat manner oriented in the same direction, and the prescribed adjacent unit cells are electrically connected in series so as to connect the plurality of unit cells in series, at least one of a through hole connecting portion, a filled via connecting portion and a bump connecting portion is provided in the polymer electrolyte film between the prescribed adjacent unit cells for establishing electrical connection between the prescribed adjacent unit cells.

According to the present invention as described above, it is possible to provide a fuel cell having a structure wherein a plurality of unit cells provided in a flat manner are electrically connected in series. Specifically, since the insulating portion electrically insulated from the respective unit cells and having approximately the same thickness as that of the unit cell is provided between the prescribed adjacent unit cells, or since part of one plate-like polymer electrolyte film is used as the electrolyte film forming each unit cell, the polymer electrolyte film is arranged between the unit cells, and the plurality of unit cells are arranged in a flat manner oriented in the same direction, the techniques of the through hole connection, the filled via connection and the bump connection that have been widely used can be applied to the electrical serial connection between the unit cells.

Further, a separator of the present invention is configured that a separator on the fuel feed side for a polymer electrolyte fuel cell of a direct methanol type in which a methanol aqueous solution is directly used as fuel, and of a flat type, comprises a plate-like member provided with a plurality of through holes each arranged perpendicular to a surface thereof for feeding fuel to the side of an electrolyte of the fuel cell, the plate-like member being formed, on its surface where fuel is fed, with fuel feed grooves and grooves connecting the through holes.

Generally, in the flat-type PEFC, its whole is enclosed by a housing. Accordingly, in the foregoing separator, the through holes, the fuel feed grooves and the grooves connecting the through holes of the plate-like member respectively form fuel feed passages between the contacting plate-like member and housing.

Further, a separator of the present invention is configured that a separator on the fuel feed side for a polymer electrolyte fuel cell of a direct methanol type in which a methanol aqueous solution is directly used as fuel, and of a flat type, comprises a plate-like member provided with a plurality of through holes each arranged perpendicular to a surface thereof for feeding fuel to the side of an electrolyte of the fuel cell, and a cover portion covering one surface of the plate-like member, wherein fuel feed grooves and grooves connecting the through holes are formed on the surface of the plate-like member contacting the cover portion so that the through holes, the fuel feed grooves and the grooves connecting the through holes respectively form fuel feed passages between the contacting plate-like member and cover portion.

Further, a separator of the present invention is configured that a separator on the fuel feed side for a polymer electrolyte fuel cell of a direct methanol type in which a methanol aqueous solution is directly used as fuel, and of a flat type, comprises a plate-like member provided with a plurality of through holes each arranged perpendicular to a surface thereof for feeding fuel to the side of an electrolyte of the fuel cell, and a cover portion covering one surface of the plate-like member, wherein fuel feed grooves and grooves connecting the through holes are formed on a surface of the cover portion contacting the plate-like member so that the through holes of the plate-like member, and the fuel feed grooves and the grooves connecting the through holes of the cover portion respectively form fuel feed passages between the contacting plate-like member and cover portion.

Further, in the foregoing separator, the separator of the present invention is configured that the plurality of fuel feed grooves or grooves connecting the through holes are connected to each through hole.

Further, in the foregoing separator, the separator of the present invention is configured that the plate-like member has a body made of metal, and a protective layer in the form of an acid proof and electrically conductive resin layer or the like is provided at least on a surface portion of the body on the side of the electrolyte of the fuel cell.

Further, in the foregoing separator, the separator of the present invention is configured that the protective layer is formed by forming a film through electrodeposition using an electrodeposition liquid obtained by mixing carbon particles and a conductive material such as anticorrosive metal into resin, then heating it to be hardened, or by forming a film, through electrolytic polymerization, that is in the state where resin made of conductive polymers includes dopants that increase conductivity.

Further, a polymer electrolyte fuel cell of the present invention is configured that a polymer electrolyte fuel cell of a direct methanol type in which a methanol aqueous solution is directly used as fuel, and of a flat type, uses a separator for the polymer electrolyte fuel cell comprising a plate-like member provided with a plurality of through holes each arranged perpendicular to a surface thereof for feeding fuel to the side of an electrolyte of the fuel cell, the plate-like member formed, on its surface where fuel is fed, with fuel feed grooves and grooves connecting the through holes, so that the fuel is fed via the through holes of the separator.

Further, a polymer electrolyte fuel cell of the present invention is configured that a polymer electrolyte fuel cell of a direct methanol type in which a methanol aqueous solution is directly used as fuel, and of a flat type, uses a separator for the polymer electrolyte fuel cell comprising a plate-like member provided with a plurality of through holes each arranged perpendicular to a surface thereof for feeding fuel to the side of an electrolyte of the fuel cell, and a cover portion covering one surface of the plate-like member, wherein fuel feed grooves and grooves connecting the through holes are formed on the surface of the plate-like member contacting the cover portion so that the through holes, the fuel feed grooves and the grooves connecting the through holes respectively form fuel feed passages between the contacting plate-like member and cover portion, so that the fuel is fed via the through holes of the separator.

Further, a polymer electrolyte fuel cell of the present invention is configured that a polymer electrolyte fuel cell of a direct methanol type in which a methanol aqueous solution is directly used as fuel, and of a flat type, uses a separator for the polymer electrolyte fuel cell comprising a plate-like member provided with a plurality of through holes each arranged perpendicular to a surface thereof for feeding fuel to the side of an electrolyte of the fuel cell, and a cover portion covering one surface of the plate-like member, wherein fuel feed grooves and grooves connecting the through holes are formed on a surface of the cover portion contacting the plate-like member so that the through holes of the plate-like member, and the fuel feed grooves and the grooves connecting the through holes of the cover portion respectively form fuel feed passages between the contacting plate-like member and cover portion, so that the fuel is fed via the through holes of the separator.

Structured as described above, the separator for the direct methanol-type and flat-type polymer electrolyte fuel cell of the present invention can solve the problem of uneven fuel feeding depending on places, particularly in the direct methanol-type and flat-type PEFC.

Namely, by providing the grooves connecting the through holes, the problem of uneven fuel feeding depending on places can be solved.

Particularly, owing to the structure wherein the plurality of (two or more) grooves are connected to each through hole, the solution for the problem of uneven fuel feeding depending on places can be further advanced.

Further, the plate-like member has the body made of metal, and the protective layer in the form of the acid proof and electrically conductive resin layer or the like is provided at least on the surface portion of the body on the side of the electrolyte of the fuel cell. This provides the structure that can bear practical use.

Structured as described above, the polymer electrolyte fuel cell of the present invention can solve the problem of uneven fuel feeding depending on places, particularly in the direct methanol-type and flat-type PEFC.

BRIEF DESCRIPTION OF THE DRAWINGS

FIG. 4($a$) to FIG. 4($d$) are manufacture process diagrams when a filled via connecting portion is formed as a front-back connecting portion in the first example.

BEST MODE FOR CARRYING OUT THE INVENTION

Now, embodiments of the present invention will be described.

Examples of the embodiments of polymer electrolyte fuel cells of the present invention will be described based on FIGS. 1 to 9.

In FIGS. 1 to 9, 10 denotes a unit cell, 11 a fuel electrode side separator (collector, or also called a bipolar plate), 12 an air electrode side separator (collector, or also called a bipolar plate), 13 a polymer electrolyte film, 14 an insulating portion, 16 a through hole, 20 a connecting portion, 21 connection wiring, 22 a front-back connecting portion, 26, 27 wiring, 31 copper foil, 33 a plating layer, 35, 36 conductive paste, 41, 42 copper foil, 45 a bump, 46 a contact portion, 50 a unit cell, 51 a fuel electrode side separator (collector, or also called a bipolar plate), 52 an air electrode side separator (collector, or also called a bipolar plate), 53 a polymer electrolyte film, 54 an insulating portion, 60 a connecting portion, 61 connection wiring, 62 a front-back connecting portion, 66, 67 wiring, 70 a unit cell, 71 a fuel electrode side separator (collector, or also called a bipolar plate), 72 an air electrode side separator (collector, or also called a bipolar plate), 73 a polymer electrolyte film, 73A a plate-like polymer electrolyte film, 80 a connecting portion, 81 connection wiring, 82 a front-back connecting portion, and 86, 87 wiring.

Figure 1:
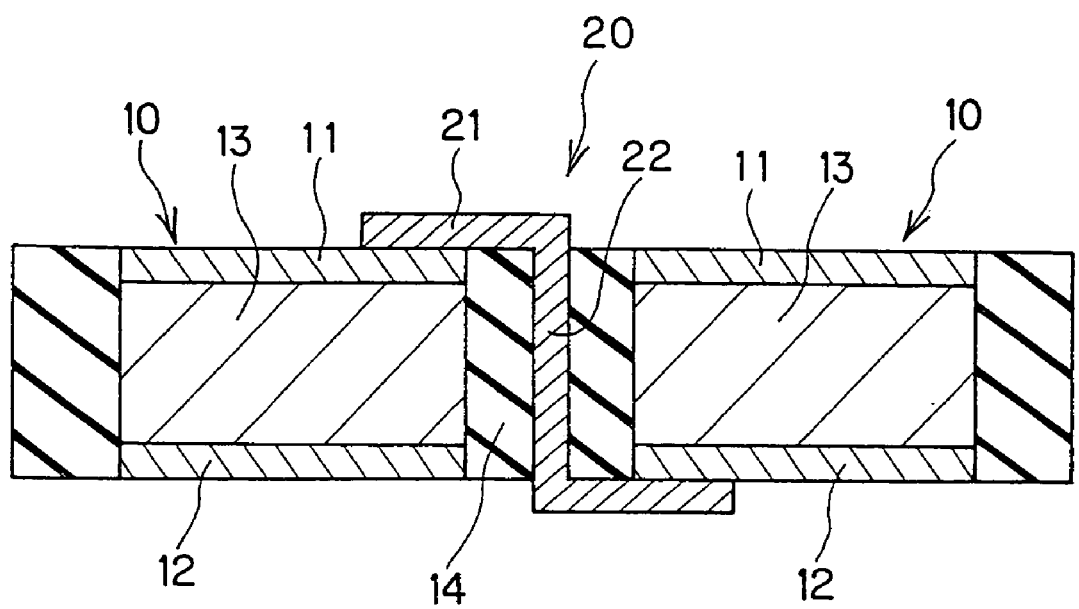
FIG. 1 is a sectional view of the first example of an embodiment of a polymer electrolyte fuel cell of the present invention.

FIGS. 3 to 5 are diagrams of the neighborhood of the connecting portion 20 in FIG. 1.

Figure 2:
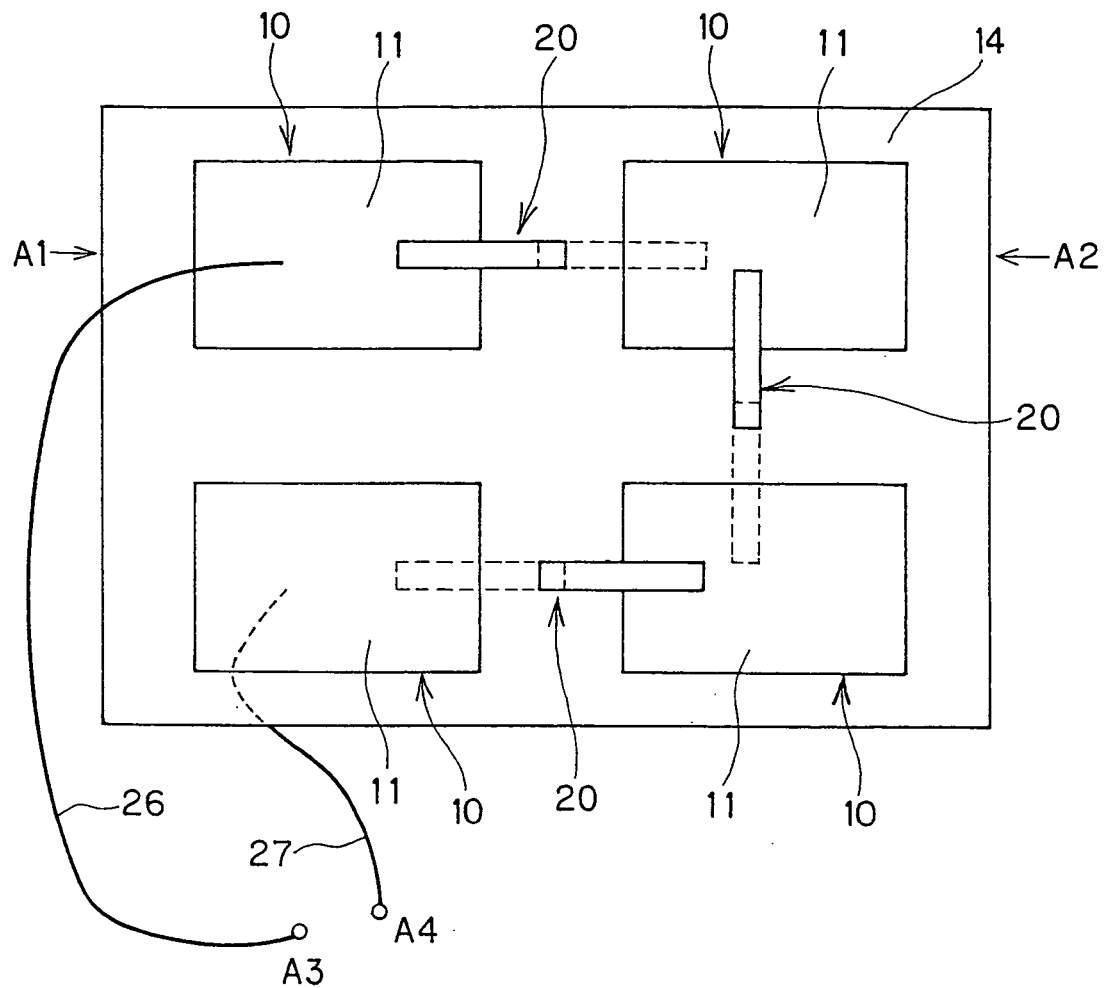
FIG. 2 is a plan view of the polymer electrolyte fuel cell shown in FIG. 1.
Figures 3A, 3B, 3C, 3D:
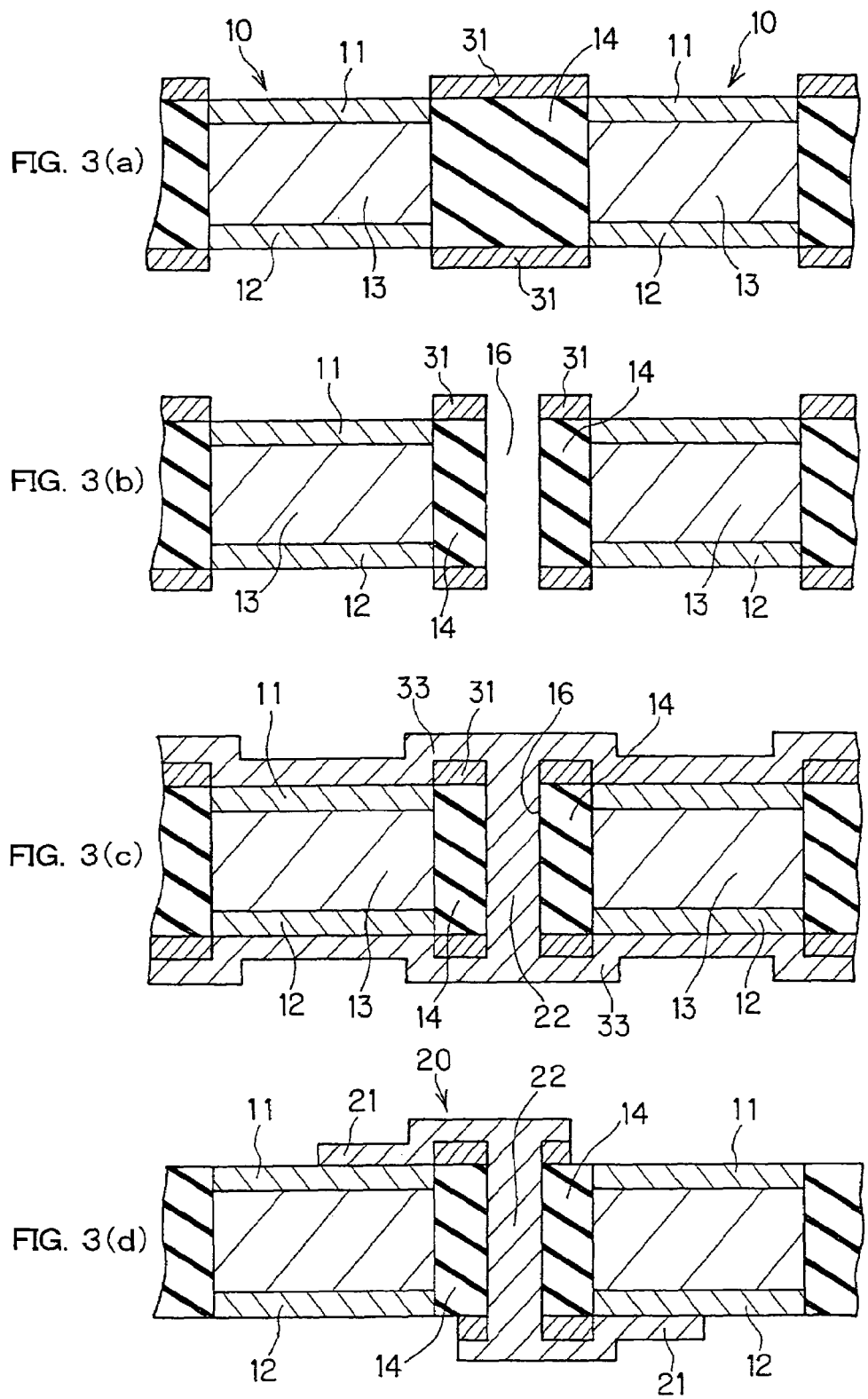
FIG. 3($a$) to FIG. 3($d$) are manufacture process diagrams when a fill-type through hole connecting portion is formed as a front-back connecting portion in the first example.
Figure 5A:
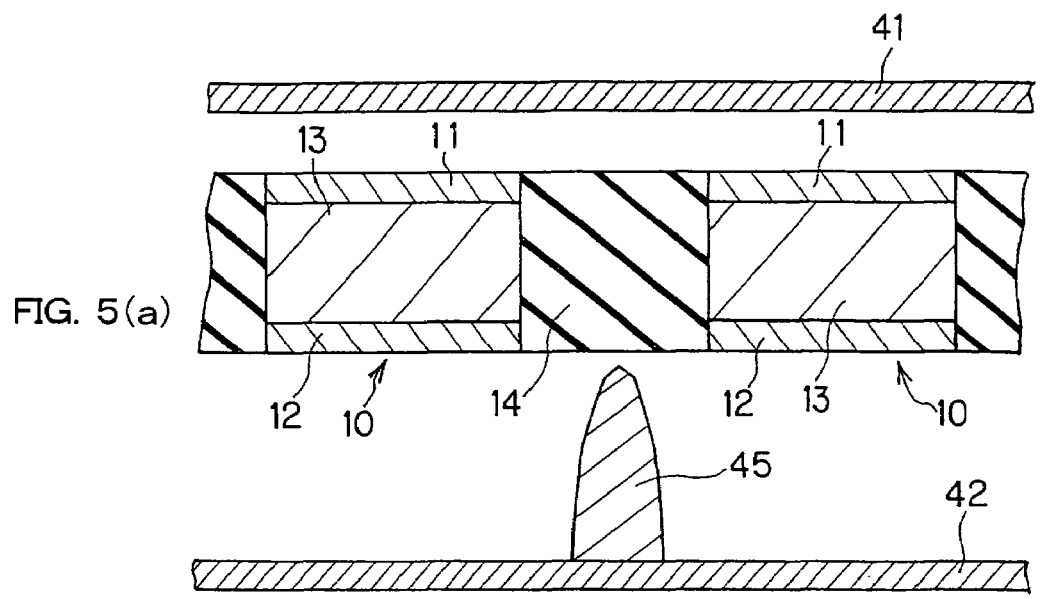
FIG. 5($a$) to FIG. 5($c$) are manufacture process diagrams when a bump connecting portion is formed as a front-back connecting portion in the first example.
Figure 5B:
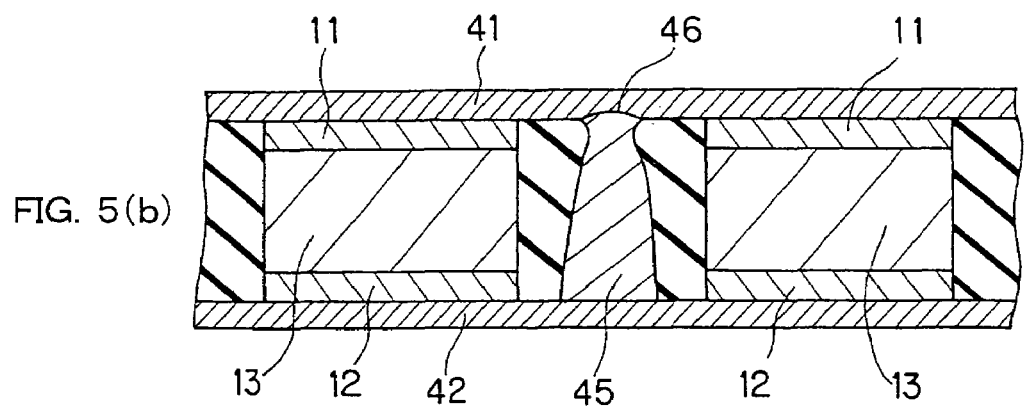
Figure 5C:
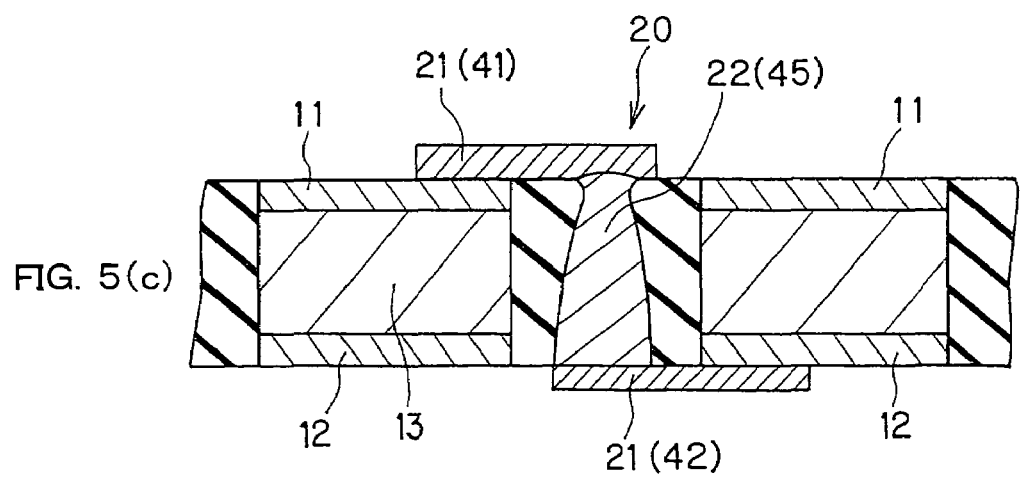
Figure 6:
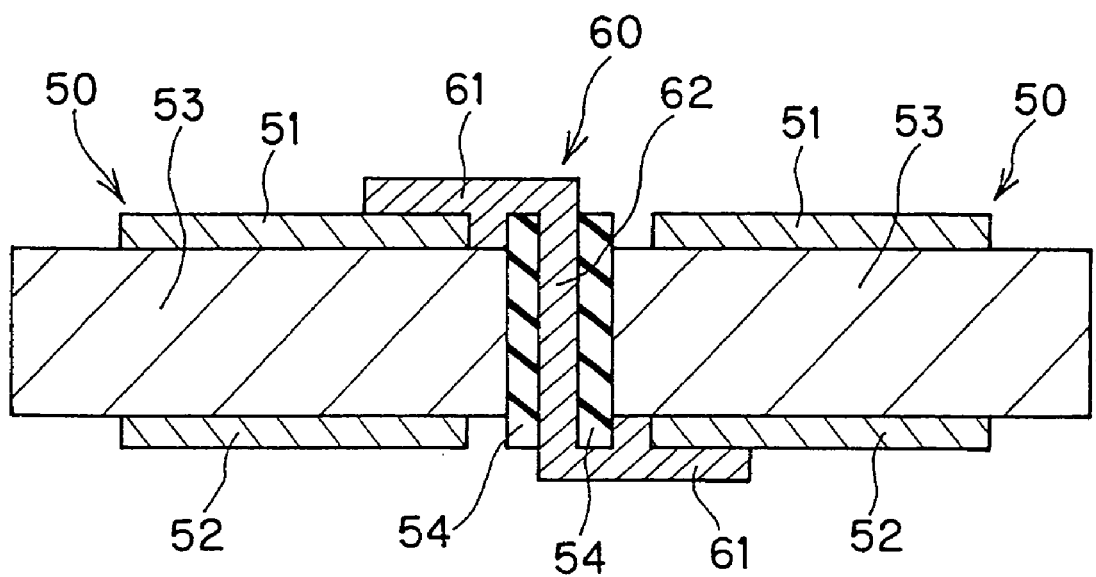
FIG. 6 is a sectional view of the second example of an embodiment of a polymer electrolyte fuel cell of the present invention.
Figure 7:
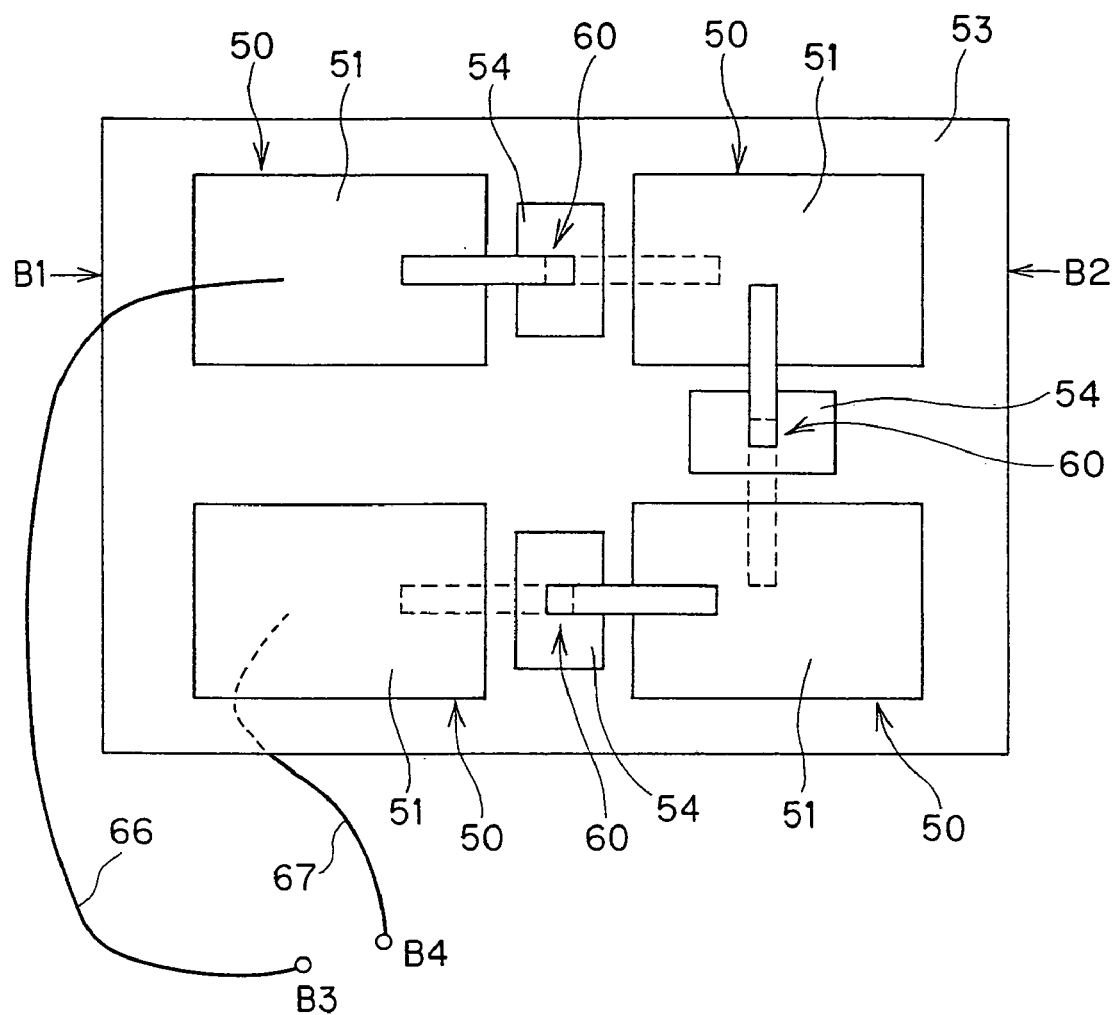
FIG. 7 is a plan view of the polymer electrolyte fuel cell shown in FIG. 6.
Figure 8:
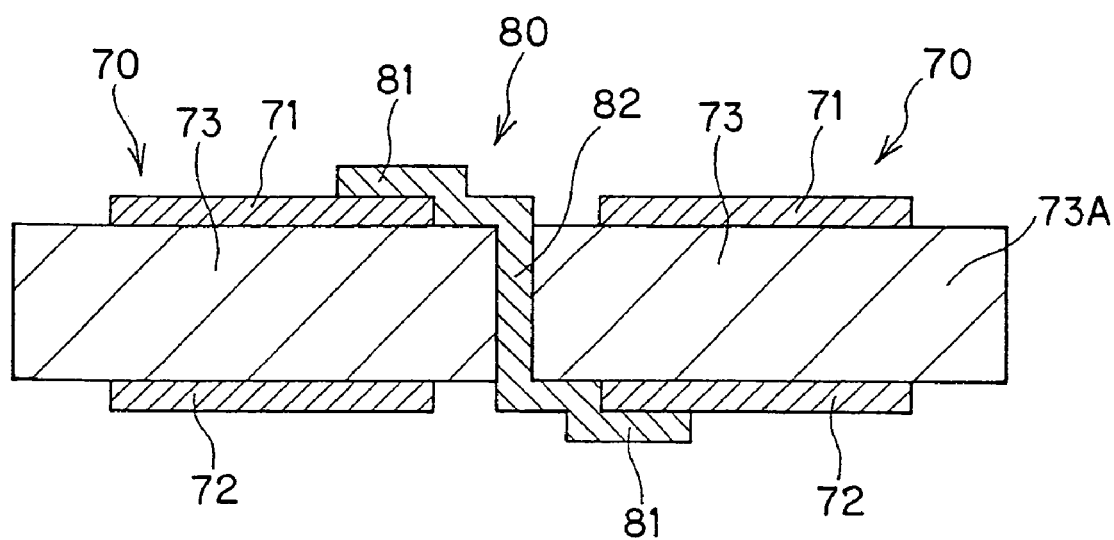
FIG. 8 is a sectional view of the third example of an embodiment of a polymer electrolyte fuel cell of the present invention.
Figure 9:
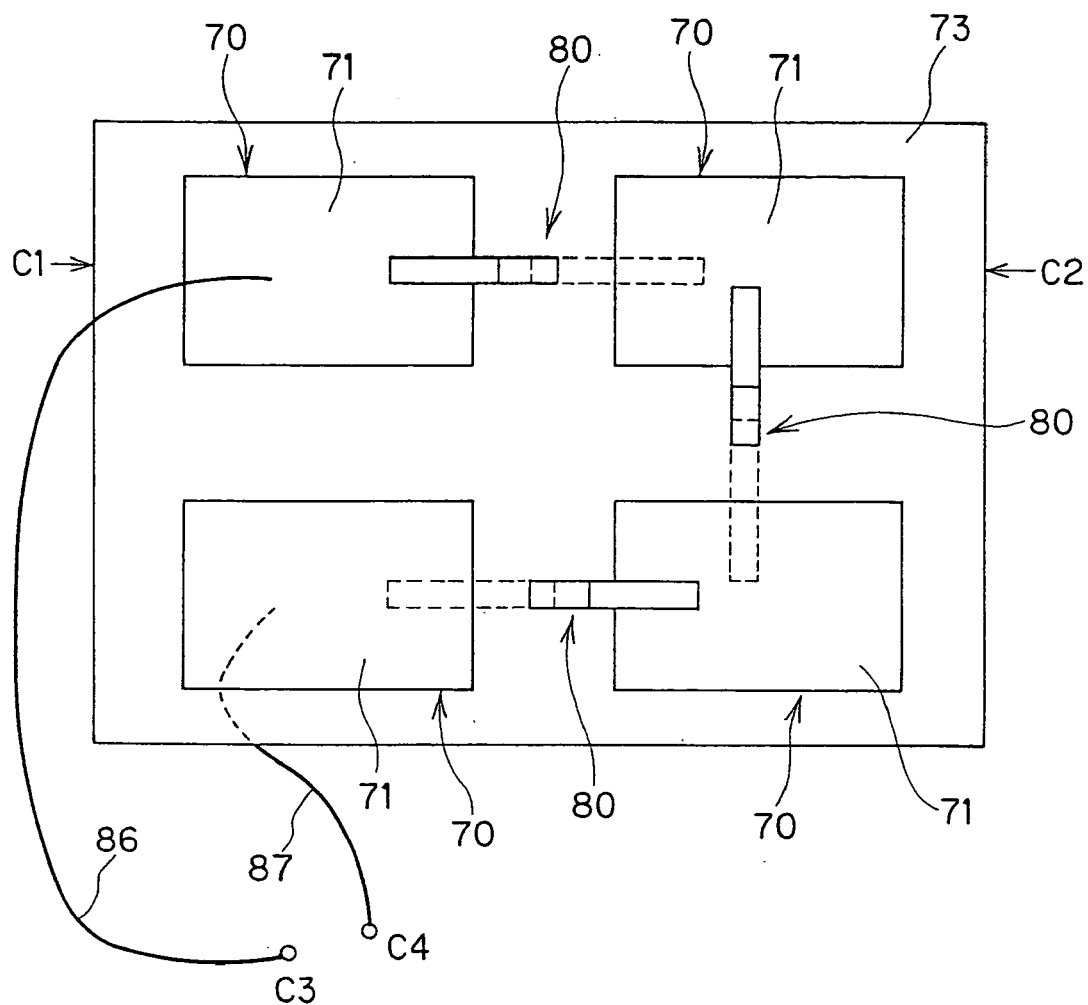
FIG. 9 is a plan view of the polymer electrolyte fuel cell shown in FIG. 8.

FIG. 1 is a sectional view taken along A1–A2 of FIG. 2, FIG. 6 is a sectional view taken along B1–B2 of FIG. 7, and FIG. 8 is a sectional view taken along C1–C2 of FIG. 9.

Further, A3 and A4 in FIG. 2, B3 and B4 in FIG. 7, and C3 and C4 in FIG. 9 denote output terminal portions.

First, the first example of the embodiment of the polymer electrolyte fuel cell of the present invention will be described based on FIGS. 1 and 2.

As shown in FIGS. 1 and 2, the polymer electrolyte fuel cell of the first example is a polymer electrolyte fuel cell wherein a plurality of unit cells 10 are arranged in a flat manner and electrically connected in series so as to produce a voltage corresponding to the number of the unit cells (four in FIG. 2). Further, around the respective unit cells 10 is provided the insulating portion 14 having approximately the same thickness as that of the unit cell, thereby to form the whole thereof in a flat manner. Namely, by providing the state wherein the unit cells 10 are fitted into bored portions of the flat plate-like insulating portion 14, the unit cells 10 and the insulating portion 14 are provided in a flat manner.

In this example, the front-back connecting portion 22 is provided, located between the prescribed adjacent unit cells and penetrating through the insulating portion 14 electrically insulated from the respective unit cells 10, for establishing connection between the front and the back. The front-back connecting portion 22 is connected, via the connection wiring 21, to the fuel electrode side separator (collector, or also called a bipolar plate) 11 of one of the adjacent unit cells and to the air electrode side separator (collector, or also called a bipolar plate) 12 of the other unit cell, thereby to electrically connect the adjacent unit cells in series.

Herein, the number of the unit cells is set to four in FIG. 2 for facilitating understanding of the explanation, but it may be five or more.

Other than the connection between the adjacent cells established by each connecting portion 20 (connection wiring 21 and front-back connecting portion 22), the insulating portion 14 insulates them from each other. There is no particular limitation to such an insulating portion 14 as long as it is excellent in terms of processability and durability. As a material of the insulating portion 14, a substrate material is normally used. For example, glass epoxy, polyimide resin or the like is used. Further, the insulating portion 14 may have a structure composed of only an insulator, or partly including a conductor.

As the connecting portions 20, through hole connecting portions, filled via connecting portions or bump connecting portions are provided in the insulating portion 14, which can be formed by applying the conventional wiring board technique.

As a material of the fuel electrode side separator 11 and the air electrode side separator 12 of the unit cell 10, such a material is desirable that can bear use in terms of conductivity, strength and corrosion resistance and that is excellent in connectability to the connection wiring 21. As the material of them, a metal material is normally used. For example, stainless steel, cold rolled steel, aluminum or the like is used. Alternatively, as the separator 12, one made of such a metal material as a base material and provided with an acid proof and electrically conductive resin film on a surface thereof on the side of the polymer electrolyte film, is applied.

Hereinbelow, with respect to one example of a manufacture method for the polymer electrolyte fuel cell of this example, the flow of the processing thereof will be briefly described based on FIG. 3. In this example, it is assumed that the front-back connecting portion 22 of the connecting portion 20 is a fill-type through hole connecting portion.

First, a glass epoxy substrate (insulating portion 14) having the copper foils 31 on both sides is formed with hole portions into which unit cells are fitted, then the unit cells 10 are fitted into the hole portions, oriented in the same direction. (FIG. 3(a))

Then, the through hole 16 for forming the fill-type through hole connecting portion is formed using a drill or laser. (FIG. 3(b))

Then, after performing a desmear process and a catalyst applying process, electroless plating is applied to the whole surface, including a surface portion, of the through hole 16, and further, electrolytic plating is applied to an electroless plating layer. By this, the through hole 16 is filled with the plating layer 33 to form the front-back connecting portion 22, so that the front and the back become electrically connectable. (FIG. 3(c))

As the electroless plating, electroless nickel plating, electroless copper plating or the like is suitably performed. The electroless plating is performed using a prescribed plating liquid, after carrying out an activation process with a catalyst. On the other hand, as the electrolytic plating, copper plating is normally implemented.

Then, resist photoengraving is performed on the whole front and back surfaces, and the plating layer 33 exposed from the resist is etched to form the connection wiring 21, then removal of the resist, and a cleaning process if necessary, are carried out, thereby to obtain the polymer electrolyte fuel cell of this example. (FIG. 3(d))

As the etching liquid, one that can selectively etch the plating layer 33 separately from the fuel electrode side separator 11 and the air electrode side separator 12, is used. As such an etching liquid, a ferric chloride liquid or the like is used, and an etching condition can be determined taking into account the material of the separators and the etching rate of the copper wiring.

Herein, the through hole 16 is filled with the plating layer 33, but not limited thereto. For example, the through hole 16 may be formed to be large, and the state after the plating may be such that, while the plating layer 33 is formed on the inner wall surface of the through hole 16, the through hole 16 still penetrates through between the front and the back, thereby to form an ordinary through hole connecting portion.

Then, with respect to one example of a manufacture method for the polymer electrolyte fuel cell of this example, the flow of the processing thereof will be briefly described based on FIG. 4. In this example, it is assumed that the front-back connecting portion 22 of the connecting portion 20 is a filled via connecting portion.

First, a glass epoxy substrate (insulating portion 14) is formed with hole portions into which unit cells are fitted, then the unit cells 10 are fitted into the hole portions, oriented in the same direction (FIG. 4(a)), and then the through hole 16 for forming the filled via portion is formed in the insulating portion 14 using a drill or laser. (FIG. 4(b))

Then, conductive paste is applied to one surface of the glass epoxy substrate in a uniform thickness using screen printing or the like. By disposing an aspirator on the back side of the glass epoxy substrate to perform pressure reduction within the through hole 16, the conductive paste 35 is filled into the through hole 16. (FIG. 4(c))

Then, the conductive paste 36 is printed using a printing method to form the connection wiring 21, thereby to obtain the polymer electrolyte fuel cell of this example. (FIG. 4(d))

As the conductive paste, silver paste, copper paste, gold paste, palladium paste, palladium-silver paste or the like may be cited.

Then, with respect to one example of a manufacture method for the polymer electrolyte fuel cell of this example, the flow of the processing thereof will be briefly described based on FIG. 5. In this example, it is assumed that the front-back connecting portion 22 of the connecting portion 20 is a bump connecting portion.

First, using an insulating substrate (insulating portion 14) such as a glass epoxy substrate, hole portions into which unit cells are fitted are formed, then the unit cells 10 are fitted into the hole portions, oriented in the same direction. Then, the copper foil 41 is prepared on one surface of the insulating substrate (insulating portion 14), and the copper foil 42 formed thereon with the conductive bump 45 on the side of the insulating substrate (insulating portion 14) is prepared on the other surface. (FIG. 5(a)) Then, the copper foil 41 and the copper foil 42 are stacked onto the insulating substrate (insulating portion 14) (FIG. 5(b)). Through this stacking, the state is achieved wherein the bump 45 penetrates through the insulating portion 14 to be connected to the copper foil 41.

As the bump 45, one obtained by printing conductive paste a plurality of times to form it into a bump, a wire bump, one obtained by further coating the wire bump with conductive paste, or the like may be applied.

Upon forming the bump, it is necessary to obtain the height of the bump portion and sharpen its tip.

Then, resist photoengraving is performed on the whole front and back surfaces, and the copper foils 41 and 42 exposed from the resist are etched to form the connection wiring 21. Then, removal of the resist, and a cleaning process if necessary, are carried out, thereby to obtain the polymer electrolyte fuel cell of this example. (FIG. 5(c))

The forming methods for the connecting portion 20 shown in FIGS. 3 to 5 are only examples, and, thus not limited thereto.

As described above, in the first example, since the insulating portion 14 electrically insulated from the respective unit cells and having approximately the same thickness as that of the unit cell is provided between the prescribed adjacent unit cells, the through hole connection, the filled via connection, the bump connection or the like that has been widely used can be adopted as the connecting portion 20. The formation of the connecting portion 20 is electrically stable with no influence to the respective unit cells.

Next, the second example of the embodiment of the polymer electrolyte fuel cell of the present invention will be described based on FIGS. 6 and 7.

Like the first example, the second example is a polymer electrolyte fuel cell wherein a plurality of unit cells 50 are arranged in a flat manner and electrically connected in series so as to produce a voltage corresponding to the number of the unit cells (four in FIG. 7). At a portion between the unit cells 50 that are provided with the connecting portion 60 therebetween, the insulating portion 54 having approximately the same thickness as that of the unit cell is provided, and the whole thereof is formed in a flat manner. Namely, it is configured that part of the polymer electrolyte film 53 between the adjacent unit cells provided with the front-back connecting portion 62 is replaced with the insulating portion 54.

In case of the second example, a plurality of (four in FIG. 7) fuel electrode side separators 51 and air electrode side separators 52 provided on both sides of one flat plate-like polymer electrolyte film 53, respectively, are arranged in a spaced-apart manner. Further, the fuel electrode side separator 51 and the air electrode side separator 52 of each unit cell 50 have the same size and correspond to each other in the same position, and the respective unit cells are isolated from each other.

Orientation of the respective unit cells 50 is the same and, for electrically connecting them in series, the front-back connecting portions become surely necessary.

Also in case of the second example, like in case of the first example, the front-back connecting portion 62 is provided, located between the prescribed adjacent unit cells and penetrating through the insulating portion 54 electrically insulated from the respective unit cells 50, for establishing connection between the front and the back. The front-back connecting portion 62 is connected, via the connection wiring 61, to the fuel electrode side separator 51 of one of the adjacent unit cells and to the air electrode side separator 52 of the other unit cell, thereby to electrically connect the adjacent unit cells.

Also herein, the number of the unit cells is set to four in FIG. 7 for facilitating understanding of the explanation, but it may be five or more.

In case of the second example, those portions (materials and structures, etc.) that are the same as those in the first example can also be applied.

Further, also in case of the second example, like in the first example, a through hole connecting portion, a filled via connecting portion or a bump connecting portion is provided in the insulating portion 54 as the connecting portion 60.

Basically, the formation of the connecting portion 60 including the front-back connecting portion 62 in the form of the through hole connecting portion, the filled via connecting portion or the bump connecting portion can be carried out similarly to the processes described in case of the first example.

Also in case of the second example, since the insulating portion 54 electrically insulated from the respective unit cells and having approximately the same thickness as that of the unit cell is provided between the prescribed adjacent unit cells, the through hole connection, the filled via connection, the bump connection or the like that has been widely used can be adopted as the connecting portion 60 like in case of the first example. Further, the formation of the connecting portion 60 is electrically stable with no influence to the respective unit cells.

Next, the third example of the embodiment of the polymer electrolyte fuel cell of the present invention will be described based on FIGS. 8 and 9.

The third example is a polymer electrolyte fuel cell wherein part of one plate-like polymer electrolyte film 73A having a size greater than that of one unit cell 70 is used as the electrolyte film 73 of each unit cell 70, and a plurality of the unit cells 70 are arranged in a flat manner oriented in the same direction, and further, the prescribed adjacent unit cells 70 are electrically connected in series so as to connect all the plurality of unit cells in series, thereby to produce a voltage corresponding to the number of the unit cells 70 (four in FIG. 9). In this polymer electrolyte fuel cell, each front-back connecting portion 82 is provided in the polymer electrolyte film 73A located between the prescribed adjacent unit cells for establishing electrical connection between the prescribed adjacent unit cells.

Also in case of the third example, the front-back connecting portion 82 is connected, via the connection wiring 81, to the fuel electrode side separator 71 of one of the adjacent unit cells 70 and to the air electrode side separator 72 of the other unit cell 70, thereby to electrically connect the adjacent unit cells.

Also herein, the number of the unit cells is set to four in FIG. 9 for facilitating understanding of the explanation, but it may be five or more.

Also in case of the third example, like in the first and second examples, through hole connecting portions, filled via connecting portions, bump connecting portions or the like are provided as the connecting portions 80 in the polymer electrolyte film 73A between the prescribed adjacent unit cells to be connected.

Basically, the formation of the connecting portion 80 including the front-back connecting portion 82 in the form of the through hole connecting portion, the filled via connecting portion, the bump connecting portion or the like can be carried out similarly to the processes described in case of the first example.

Also in case of the third example, part of one plate-like polymer electrolyte film is used as the electrolyte film forming each unit cell, the polymer electrolyte film is arranged between the unit cells, and the plurality of unit cells are arranged in a flat manner oriented in the same direction, so that the manner such as the through hole connection, the filled via connection or the bump connection that has been widely used can be adopted as the connecting portion 80.

In the foregoing first to third examples, the plurality of unit cells are only arranged in a flat manner. However, there can be cited a mode in the state where a plurality of such structures are piled up (stacked).

In this case, connection of the output terminal portions (corresponding to A3 and A4 in FIG. 2, B3 and B4 in FIG. 7, and C3 and C4 in FIG. 9) in the stacking direction can be achieved similarly to the conventional stack structure.

Now, examples of the embodiments of separators for direct methanol-type and flat-type polymer electrolyte fuel cells, and polymer electrolyte fuel cells of the present invention will be described based on FIGS. 10 to 20.

In FIGS. 10 to 20, 100A, 100B, 100C denotes a separator, 110, 110a a plate-like member, 111 a through hole portion, 112 a groove, 112a a fuel feed groove, 120, 120a a cover portion, 122 a groove, 130 a unit cell, 132 an air electrode side separator, 133 a polymer electrolyte film, 134 an insulating portion, 136 a through hole, 140 a connecting portion, 141 connection wiring, 142 a front-back connecting portion, 146, 147 wiring, 151 copper foil, 153 a plating layer, 160 a unit cell, 162 an air electrode side separator, 163 a polymer electrolyte film, 164 an insulating portion, 170 a connecting portion, 171 connection wiring, 172 a front-back connecting portion, 180 a unit cell, 182 an air electrode side separator, 183 a polymer electrolyte film, 183A a plate-like polymer electrolyte film, 190 a connecting portion, 191 connection wiring, and 192 a front-back connecting portion.

Figure 10:
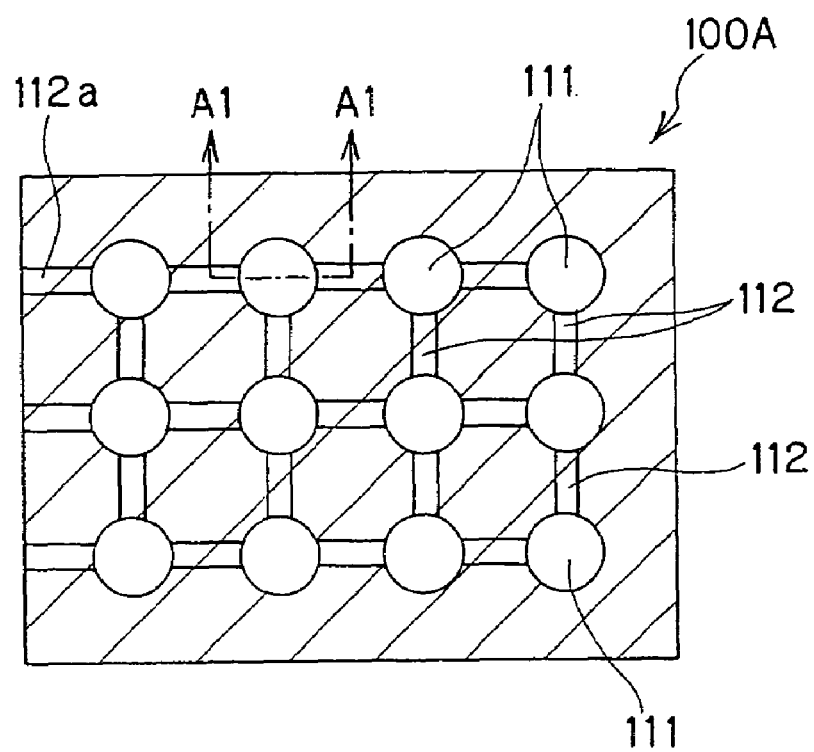
FIG. 10 is a sectional view of the first example of an embodiment of a separator for a direct methanol-type and flat-type polymer electrolyte fuel cell of the present invention.
Figure 11:
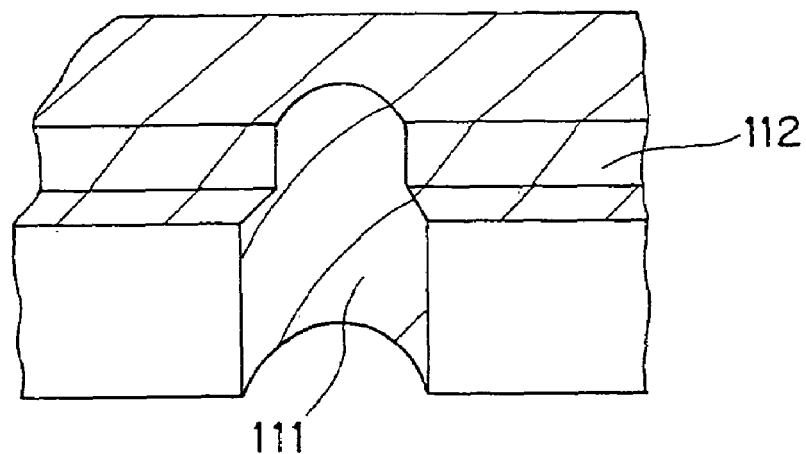
FIG. 11 is a diagram showing a through hole of the separator shown in FIG. 10.
Figure 16:
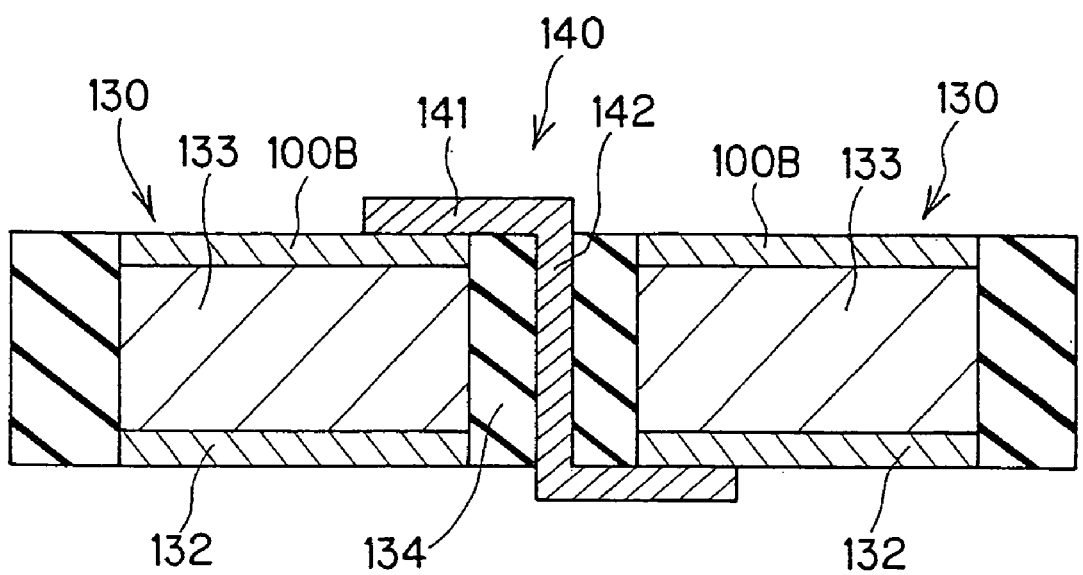
FIG. 16 is a sectional view of the first example of an embodiment of a polymer electrolyte fuel cell of the present invention.
Figure 17:
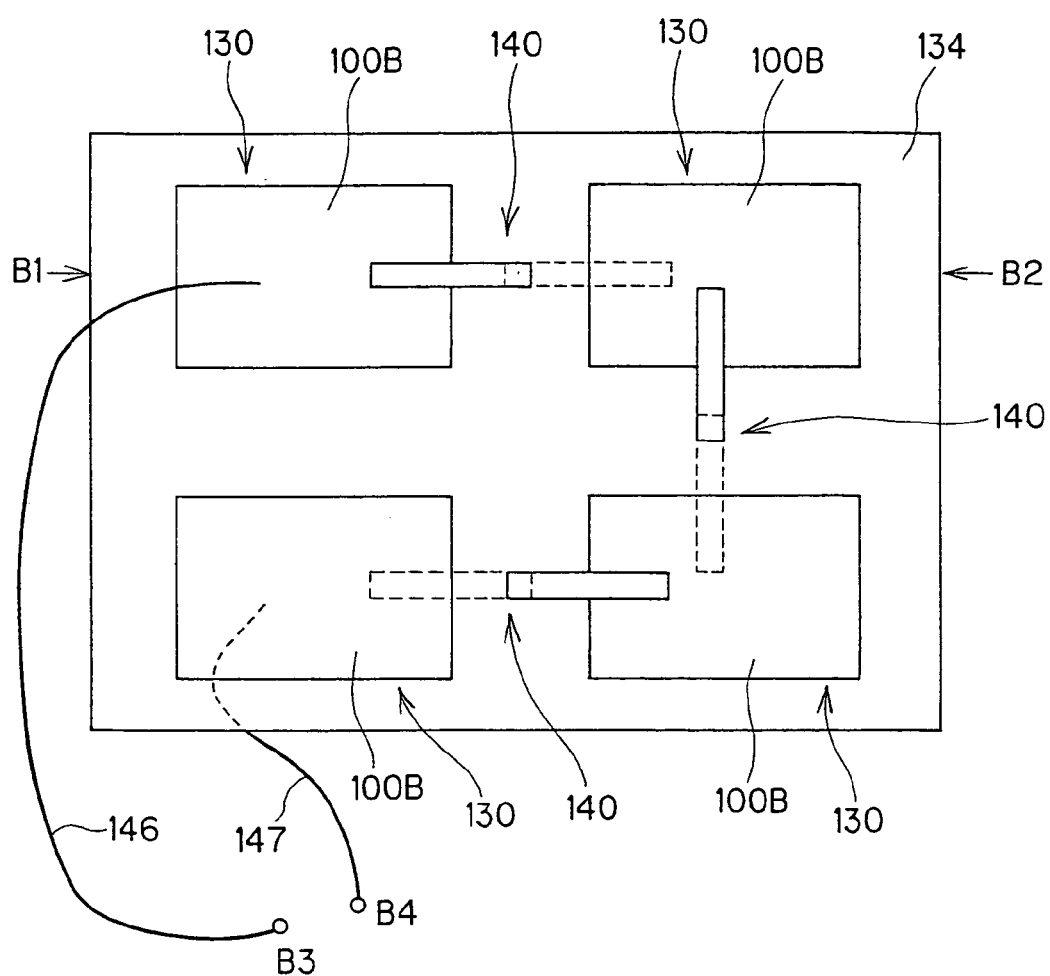
FIG. 17 is a plan view of the polymer electrolyte fuel cell shown in FIG. 16.

FIG. 11 is a diagram seen from one-dot chain line toward the side of A1, A2 in FIG. 10, and FIG. 16 is a sectional view taken along B1–B2 of FIG. 17. In FIG. 17, B3 and B4 denote output terminal portions.

Figure 18:
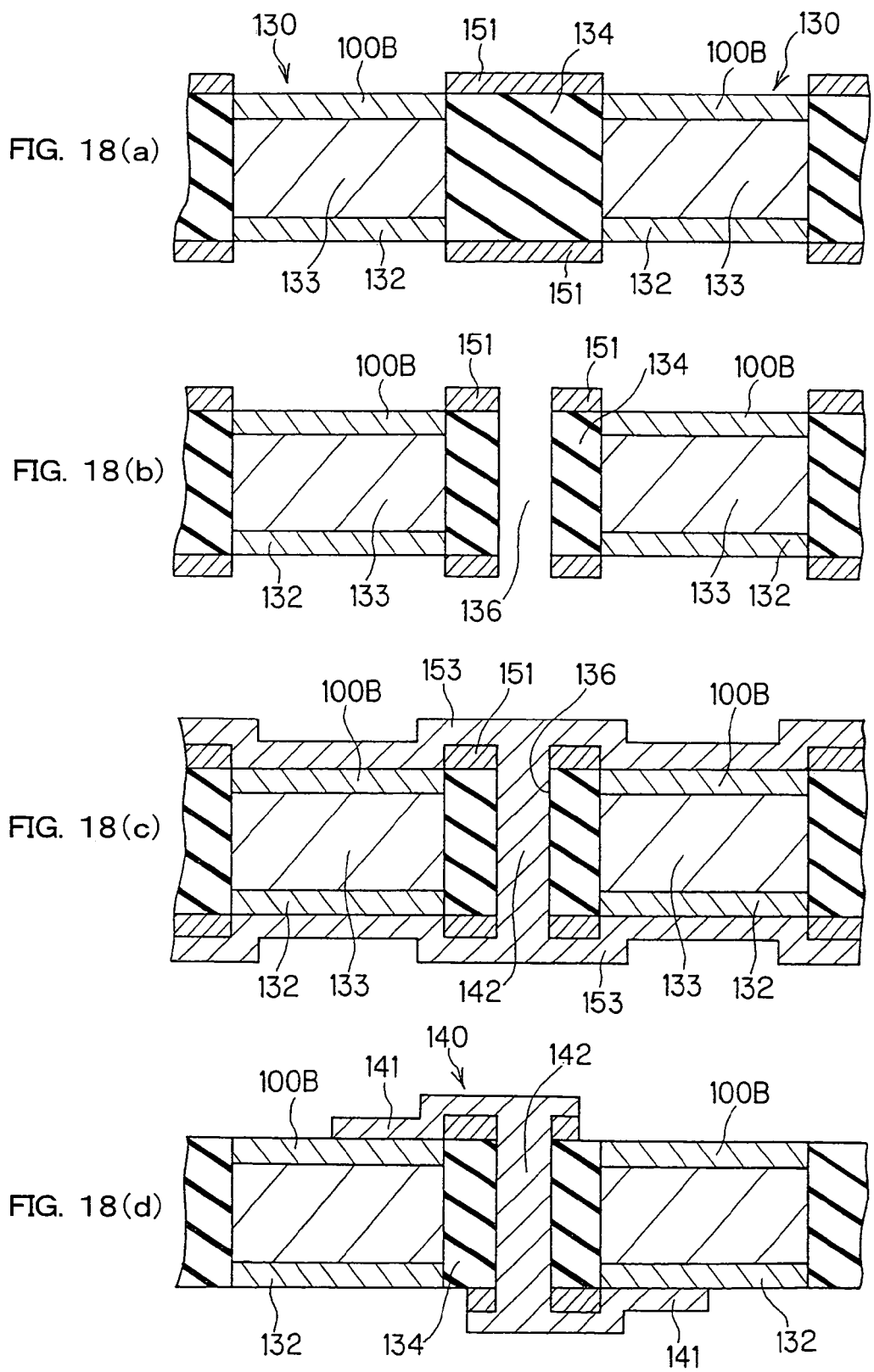
FIG. 18($a$) to FIG. 18($d$) are manufacture process sectional views of a connecting portion of the polymer electrolyte fuel cell shown in FIG. 17.

FIG. 18 is a diagram of the neighborhood of the connecting portion 140 in FIG. 16.

First, the first example of the embodiment of the separator for the direct methanol-type and flat-type polymer electrolyte fuel cell of the present invention will be described based on FIG. 10.

The first example is a separator on the fuel feed side for the polymer electrolyte fuel cell of the direct methanol type in which a methanol aqueous solution is directly used as fuel, and of the flat type. As shown in FIG. 10, the separator 100A has the plate-like member 110 formed with a plurality of through holes 111 each approximately perpendicular to the surface thereof for feeding fuel to the side of the electrolyte of the fuel cell, and further formed with fuel feed grooves 112a and grooves 112 connecting the through holes, on a surface where fuel is fed.

In case of this example, in the state of being assembled as the cell, a housing (not shown) enclosing the whole and the surface of the plate-like member 110 on which the fuel feed grooves 112a and the grooves 112 connecting the through holes are formed, contact each other. By this, the through hole portions 111, the fuel feed grooves 112a and the grooves 112 connecting the through holes of the plate-like member 110 respectively form fuel feed passages between the contacting plate-like member 110 and housing.

The plate-like member 110 has a body made of metal, and a protective layer in the form of an acid proof and electrically conductive resin layer is provided at least on the surface portion of the body on the side of the electrolyte of the fuel cell. This protective layer can be provided, for example, at a portion shown by hatching in FIGS. 10 and 11.

There is no particular limitation to a material of the plate-like member 110 as long as it can bear fuel use, has acid resistance and electrical conductivity, and ensures a prescribed strength.

The metal body of the plate-like member 110 can be processed into a prescribed shape by machining or etching using the photolithography technique.

As a method of providing the acid proof and electrically conductive resin layer on the surface portion of the body made of metal, there can be cited a method wherein a film is formed by electrodeposition using an electrodeposition liquid obtained by mixing carbon particles and a conductive material such as anticorrosive metal into resin, then it is heated to be hardened, a method of forming a film, by electrolytic polymerization, that is in the state where resin made of conductive polymers includes dopants for increasing conductivity, or the like.

The electrodeposition is carried out in the state where anionic or cationic synthetic resin having an electrodepositing property is used as an electrodeposition liquid for electrodepositing a resin film, and a conductive material is dispersed in the electrodeposition liquid.

Although resin itself of the resin film formed by electrodeposition has no conductivity, because the film is formed in the state where the conductive material is mixed in the resin, the resin film exhibits conductivity.

As the anionic resin to be used, acrylic resin, polyester resin, maleic oil resin, polybutadiene resin, epoxy resin, polyamide resin, polyimide resin or the like can be used alone or as a mixture in optional combination of these resins.

Further, the foregoing anionic synthetic resin and cross-linking resin such as melamine resin, phenol resin or urethane resin may be used jointly.

As the cationic synthetic resin, acrylic resin, epoxy resin, urethane resin, polybutadiene resin, polyamide resin, polyimide resin or the like can be used alone or as a mixture in optional combination of them. Further, the foregoing cationic synthetic resin and cross-linking resin such as polyester resin or urethane resin may be used jointly.

Further, for giving viscosity to the foregoing resin, it is possible to add viscosity giving resin such as rosin, turpentine or petroleum resin if necessary.

The foregoing resin is subjected to an electrodeposition method in the state where it is neutralized by an alkaline substance or an acid substance to be soluble in water, or in the state of water dispersion. Specifically, the anionic synthetic resin is neutralized by amine such as trimethylamine, diethylamine, dimethylethanolamine or diisopropanolamine, or inorganic alkali such as ammonia or potassium hydroxide. The cationic synthetic resin is neutralized by acid such as acetic acid, formic acid, propionic acid or lactic acid.

Then, the resin neutralized to be soluble in water is used as a water dispersion type or a soluble type in the state where it is diluted with water.

In case of the resin film formation using electrodeposition, there can be cited carbon particles, anticorrosive metal or the like, but not limited thereto as long as an acid proof and electrically conductive resin layer can be obtained.

Basically, electrolytic polymerization is a method wherein electrodes are immersed in an electrolytic solution containing aromatic compounds as monomers to cause energization, thereby to perform polymerization through electrochemical oxidation or reduction. Since this method is well known, details are omitted herein.

Conductive polymers can be synthesized directly into a film shape by electrolytic polymerization, but, in this example, are in the state where the electrolytically polymerized resin contains dopants that increase conductivity.

For achieving the state where the electrolytically polymerized resin contains therein dopants that further increase conductivity, a method of electrochemical doping wherein dopants are contained upon electrolytic polymerization, a method of liquid phase doping wherein, after electrolytic polymerization, conductive resin (polymer) formed through the electrolytic polymerization is immersed into a dopant liquid itself or a solution containing dopant molecules, or the like can be used.

The dopants can be eliminated or neutralized by short-circuiting the cathode and the anode or applying a reverse voltage after the polymerization, and further, it is possible to perform doping and dedoping reversibly by further controlling the voltage, thereby to control the dopant concentration.

As donor-type dopants that give electrons, among dopants that are used for the resin film formation using electrolytic polymerization, there can be cited alkali metal, alkylammonium ions or the like. As acceptor-type dopants that snatch electrons, there can be cited halogen, Lewis acid, protonic acid, transition metal halide or organic acid.

Now, the second example of the embodiment of the separator for the direct methanol-type and flat-type polymer electrolyte fuel cell of the present invention will be described based on FIG. 12.

Like the first example, the second example is a separator on the fuel feed side for the polymer electrolyte fuel cell of the direct methanol type in which a methanol aqueous solution is directly used as fuel, and of the flat type. This separator 100B also uses the plate-like member 110 that is the same as that in the first example. The separator 100B comprises the plate-like member 110 formed with the through holes 111, the fuel feed grooves 112a and the grooves 112 connecting the through holes, and the cover portion 120 covering the surface of the plate-like member 110 that is formed with the grooves 112a and the grooves 112. The plate-like member 110 and the cover portion 120 contact each other so that the through hole portions 111, the fuel feed grooves 112a and the grooves 112 connecting the through holes respectively form fuel feed passages between the plate-like member 110 and the cover portion 120.

In case of this example, the cover portion 120 may be in the form of, for example, a solid stainless steel thin plate. There is no particular limitation to a material of the cover portion 120 as long as it can bear fuel use and ensures a prescribed strength. For example, in case of utilizing it for electrical connection, a metal thin plate of stainless steel, cold rolled steel, aluminum or the like is used.

Figure 13:
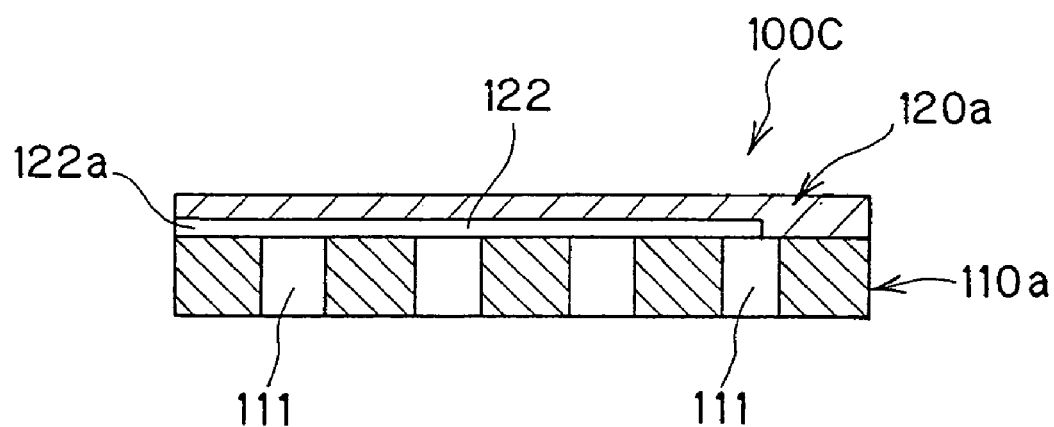
FIG. 13 is a sectional view of the third example of an embodiment of a separator for a direct methanol-type and flat-type polymer electrolyte fuel cell of the present invention.
Figure 14:
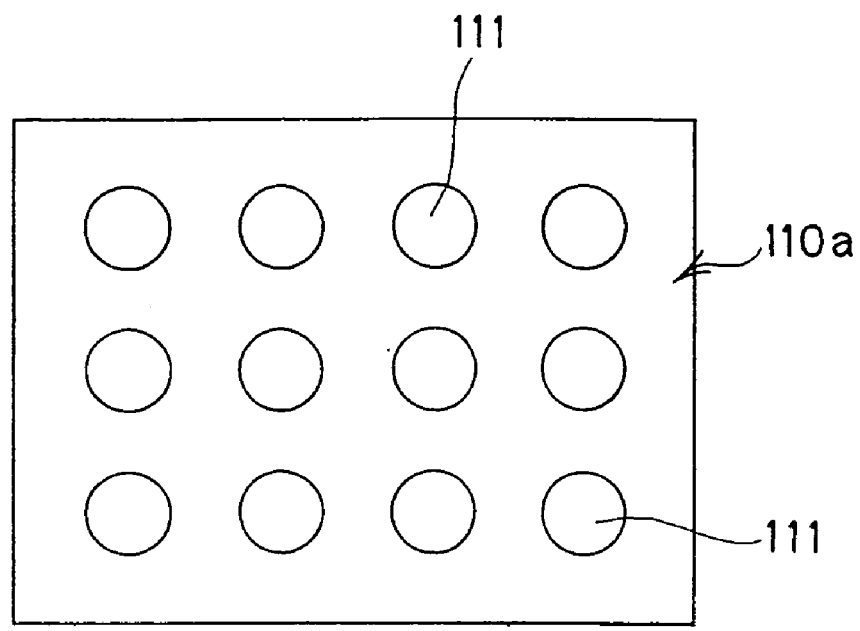
FIG. 14 is a diagram showing a plate-like member, arranged with through holes, of the separator shown in FIG. 13.
Figure 15:
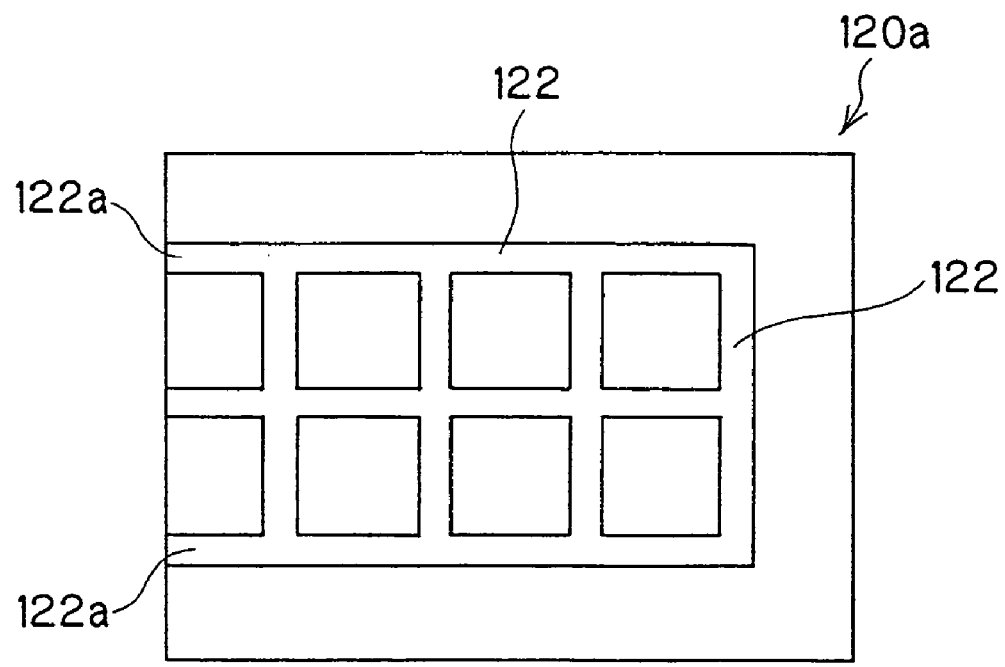
FIG. 15 is a diagram showing a cover portion of the separator shown in FIG. 13.

Now, the third example of the embodiment of the separator for the direct methanol-type and flat-type polymer electrolyte fuel cell of the present invention will be described based on FIGS. 13 to 15.

Like the second example, the separator 100C of the third example comprises the plate-like member 110a arranged with a plurality of the through hole portions 111 each approximately perpendicular to the surface thereof, and the cover portion 120a. In this separator 100C, the fuel feed grooves 122a and the grooves 122 connecting the through holes are provided on a surface of the cover portion 120a that contacts the plate-like member 110a. The plate-like member 110a and the cover portion 120a contact each other so that the through hole portions 111 of the plate-like member 110a, and the fuel feed grooves 122a and the grooves 122 connecting the through holes of the cover portion 120 respectively form fuel feed passages between the plate-like member 110a and the cover portion 120a.

The plate-like member 110a and the cover portion 120a that are the same as those in the second example may be used.

The processing of the cover portion 120a is performed normally by machining or etching when the body is metal, while performed by a general molding method such as injection molding, extrusion molding, transfer molding, calender molding, compression molding or casting, or machining such as cutting when the body is resin.

Next, the first example of the embodiment of the polymer electrolyte fuel cell of the present invention using the foregoing separator of the present invention will be described based on FIGS. 16 and 17.

Figure 12:
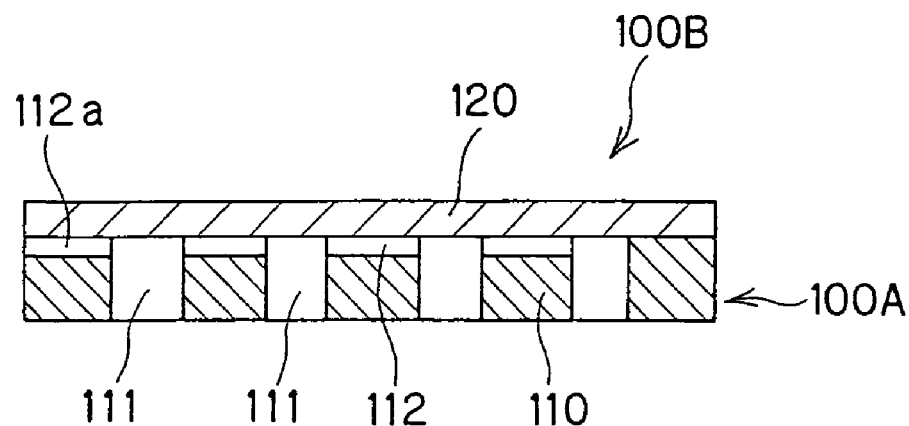
FIG. 12 is a sectional view of the second example of an embodiment of a separator for a direct methanol-type and flat-type polymer electrolyte fuel cell of the present invention.

This example is a direct methanol-type and flat-type polymer electrolyte fuel cell using the separator 100B of the second example shown in FIG. 12.

This polymer electrolyte fuel cell is a polymer electrolyte fuel cell wherein a plurality of unit cells 130 are arranged in a flat manner and electrically connected in series so as to produce a voltage corresponding to the number of the unit cells (four in FIG. 17). Further, around the respective unit cells 130 is provided the insulating portion 134 having approximately the same thickness as that of the unit cell, thereby to form the whole thereof in a flat manner. Namely, by providing the state wherein the unit cells 130 are fitted into bored portions of the flat plate-like insulating portion 134, the unit cells 130 and the insulating portion 134 are provided in a flat manner. Further, the front-back connecting portion 142 is provided, located between the prescribed adjacent unit cells and penetrating through the insulating portion 134 electrically insulated from the respective unit cells, for establishing connection between the front and the back. The front-back connecting portion 142 is connected, via the connection wiring 141, to the fuel electrode side separator 100B of one of the adjacent unit cells and to the air electrode side separator 132 of the other unit cell, thereby to electrically connect the adjacent unit cells in series.

Herein, the number of the unit cells is set to four in FIG. 17 for facilitating understanding of the explanation, but it may be five or more.

Other than the connection between the adjacent cells established by each connecting portion 140 (connection wiring 141 and front-back connecting portion 142), the insulating portion 134 insulates them from each other. There is no particular limitation to such an insulating portion 134 as long as it is excellent in terms of processability and durability.

The insulating portion 134 may have a structure composed of only an insulator, or partly including a conductor.

As a material of the insulating portion 134, a substrate material is normally used. For example, glass epoxy, polyimide or the like is used.

As the connecting portions 140, through hole connecting portions, filled via connecting portions or bump connecting portions are provided in the insulating portion 134, which can be formed by applying the conventional wiring board technique.

As a material of the air electrode side separator 132 of the unit cell 130, such a material is desirable that can bear use in terms of conductivity, strength and corrosion resistance and that is excellent in connectability to the connection wiring 141. As the material thereof, a metal material is normally used. For example, stainless steel, cold rolled steel, aluminum or the like is used.

Hereinbelow, with respect to one example of a manufacture method for the polymer electrolyte fuel cell of this example, the flow of the processing thereof will be briefly described based on FIG. 18. In this example, it is assumed that the front-back connecting portion 142 of the connecting portion 140 is a fill-type through hole connecting portion.

First, a glass epoxy substrate (insulating portion 134) having the copper foils 151 on both sides is formed with hole portions into which unit cells are fitted, then the unit cells 130 are fitted into the hole portions, oriented in the same direction. (FIG. 18(a))

Then, the through hole 136 for forming the fill-type through hole connecting portion is formed using a drill or laser. (FIG. 18(b))

Then, after performing a desmear process and a catalyst applying process, electroless plating is applied to the whole surface, including a surface portion, of the through hole 136, and further, electrolytic plating is applied to an electroless plating layer. By this, the through hole 136 is filled with the plating layer 153 to form the front-back connecting portion 142, so that the front and the back become electrically connectable. (FIG. 18(c))

As the electroless plating, electroless nickel plating, electroless copper plating or the like is suitably performed. The electroless plating is performed using a prescribed plating liquid, after carrying out an activation process with a catalyst. On the other hand, as the electrolytic plating, copper plating is normally implemented.

Then, resist photoengraving is performed on the whole front and back surfaces, and the plating layer 153 exposed from the resist is etched to form the connection wiring 141, then removal of the resist, and a cleaning process if necessary, are carried out, thereby to obtain the polymer electrolyte fuel cell of this example. (FIG. 18(d))

As the etching liquid, one that can selectively etch the plating layer 153 separately from the fuel electrode side separator 100B and the air electrode side separator 132, is used. As such an etching liquid, a ferric chloride liquid or the like is used, and an etching condition can be determined taking into account the material of the separators and the etching rate of the copper wiring.

Herein, the through hole 136 is filled with the plating layer 153, but not limited thereto. For example, the through hole 136 may be formed to be large, and the state after the plating may be such that, while the plating layer 153 is formed on the inner wall surface of the through hole 136, the through hole 136 still penetrates through between the front and the back, thereby to form an ordinary through hole connecting portion.

The forming method for the connecting portion 140 shown in FIG. 18 is one example, and thus not limited thereto.

As described above, since the insulating portion 134 electrically insulated from the respective unit cells and having approximately the same thickness as that of the unit cell is provided between the prescribed adjacent unit cells, the filled via connection, the bump connection or the like can be adopted as the connecting portion 140, in addition to the through hole connection that has been widely used. The formation of the connecting portion 140 is electrically stable with no influence to the respective unit cells.

Next, the second example of the embodiment of the polymer electrolyte fuel cell of the present invention will be described based on FIG. 19.

Figure 19:
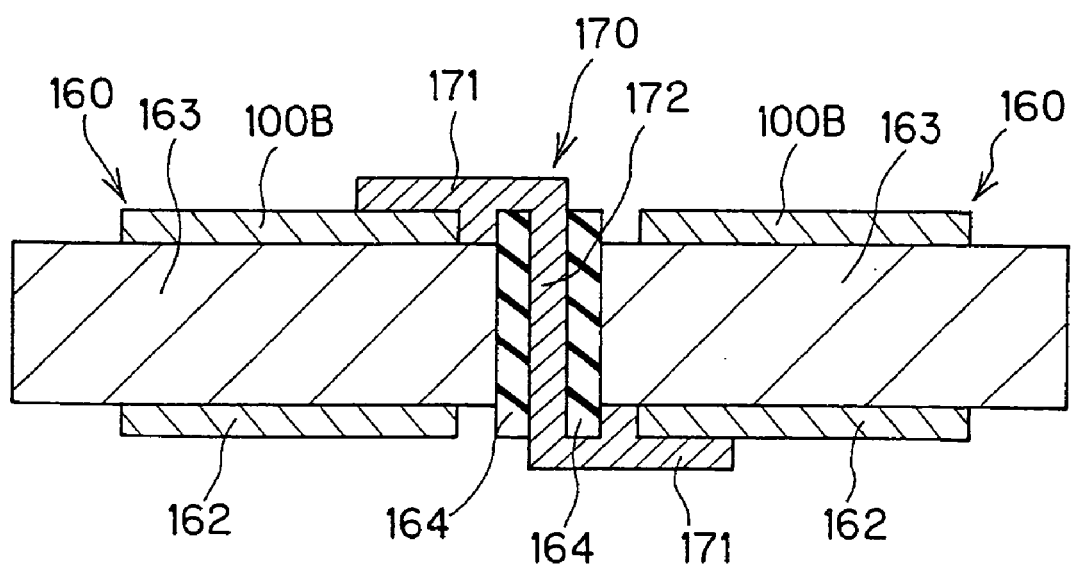
FIG. 19 is a sectional view showing the second example of an embodiment of a polymer electrolyte fuel cell of the present invention.

The polymer electrolyte fuel cell of the second example shown in FIG. 19 also uses the separator 100B of the second example shown in FIG. 12. Like the polymer electrolyte fuel cell of the first example, the second example is a polymer electrolyte fuel cell wherein a plurality of unit cells 160 are arranged in a flat manner and electrically connected in series so as to produce a voltage corresponding to the number of the unit cells (for example, four). At a portion between the unit cells 160 that are provided with the connecting portion 170 therebetween, the insulating portion 164 having approximately the same thickness as that of the unit cell is provided, and the whole thereof is formed in a flat manner. Namely, it is configured that part of the polymer electrolyte film 163 between the adjacent unit cells provided with the front-back connecting portion 172 is replaced with the insulating portion 164.

In this case, a plurality of (for example, four) fuel electrode side separators 100B and air electrode side separators 162 provided on both sides of one flat plate-like polymer electrolyte film 163, respectively, are arranged in a spaced-apart manner from each other. Further, the fuel electrode side separator 100B and the air electrode side separator 162 of each unit cell 160 have the same size and correspond to each other in the same position, and the respective unit cells are isolated from each other.

Also in case of this example, like in case of the polymer electrolyte fuel cell of the first example, the front-back connecting portion 172 is provided, located between the prescribed adjacent unit cells and penetrating through the insulating portion 164 electrically insulated from the respective unit cells 160, for establishing connection between the front and the back. The front-back connecting portion 172 is connected, via the connection wiring 171, to the fuel electrode side separator 100B of one of the adjacent unit cells and to the air electrode side separator 162 of the other unit cell, thereby to electrically connect the adjacent unit cells.

Also herein, the number of the unit cells is set to four for facilitating understanding of the explanation, but it may be five or more.

Also in case of this example, those portions (materials and structures, etc.) that are the same as those of the polymer electrolyte fuel cell in the first example can also be applied.

Next, the third example of the embodiment of the polymer electrolyte fuel cell of the present invention will be described based on FIG. 20.

Figure 20:
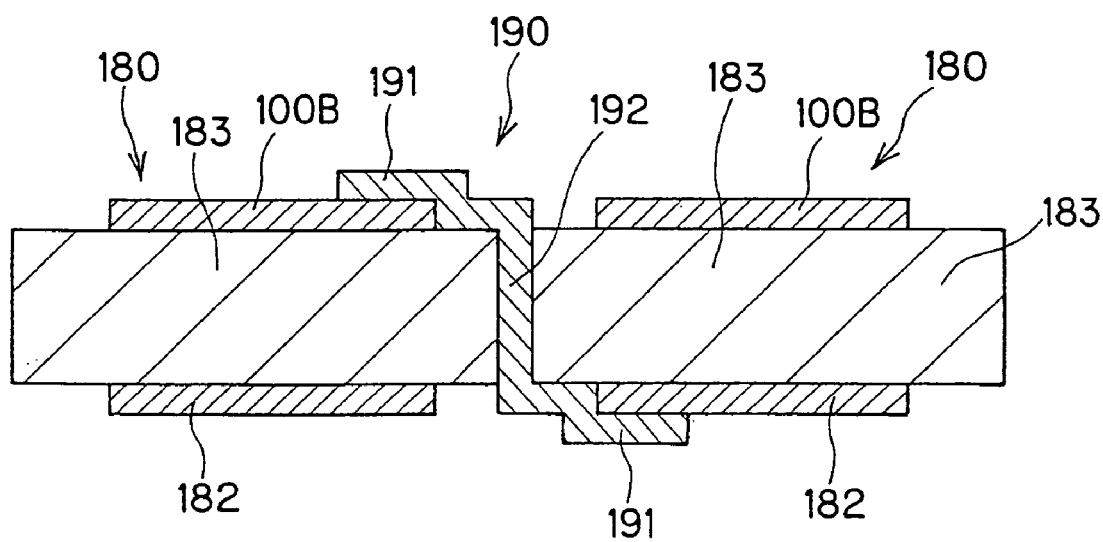
FIG. 20 is a sectional view showing the third example of an embodiment of a polymer electrolyte fuel cell of the present invention.

The polymer electrolyte fuel cell of the third example shown in FIG. 20 also uses the separator 100B of the second example shown in FIG. 12. This polymer electrolyte fuel cell is a polymer electrolyte fuel cell wherein part of one plate-like polymer electrolyte film 183A having a size greater than that of one unit cell 180 is used as the electrolyte film 183 of each unit cell 180, and a plurality of the unit cells 180 are arranged in a flat manner oriented in the same direction, and further, the prescribed adjacent unit cells 180 are electrically connected in series so as to connect all the plurality of unit cells in series, thereby to produce a voltage corresponding to the number of the unit cells (for example, four). In this polymer electrolyte fuel cell, each front-back connecting portion 192 is provided in the polymer electrolyte film 183A located between the prescribed adjacent unit cells for establishing electrical connection between the prescribed adjacent unit cells.

Also in this example, the front-back connecting portion 192 is connected, via the connection wiring 191, to the fuel electrode side separator 100B of one of the adjacent unit cells 180 and to the air electrode side separator 182 of the other unit cell 180, thereby to electrically connect the adjacent unit cells.

Also herein, the number of the unit cells is set to four for facilitating understanding of the explanation, but it may be five or more.

Also in case of this example, through hole connecting portions, filled via connecting portions, bump connecting portions or the like are provided as the connecting portions 190 in the polymer electrolyte film 183A between the prescribed adjacent unit cells to be connected.

In the foregoing examples, the structures each using the separator 100B of the second example shown in FIG. 12 have been cited. However, the separator 100A of the first example shown in FIG. 10 or the separator 100C of the third example shown in FIG. 13 may also be suitably used likewise, thereby to obtain a direct methanol-type and flat-type polymer electrolyte fuel cell.

INDUSTRIAL APPLICABILITY

As described above, the polymer electrolyte fuel cell according to the present invention is suitable for a flat-type thin-shaped fuel cell, and the separator of the present invention is suitable for being used in a direct methanol-type and flat-type polymer electrolyte fuel cell so as to uniform fuel feeding, while the polymer electrolyte fuel cell using this separator is also suitable for a flat-type thin-shaped fuel cell.

The invention claimed is:

1. A polymer electrolyte fuel cell comprising:
    a plurality of unit cells arranged in a flat manner oriented in the same direction, and wherein adjacent unit cells of the plurality of unit cells are electrically connected in series;
    insulation portions located only between the adjacent unit cells, and having a thickness approximately equal to a thickness of a unit cell; and
    at least one of a through hole connecting portion, a filled via connecting portion, and a bump connecting portion, provided in the insulating portions, the connecting portion being electrically insulated from said unit cells by said insulation portions, and being configured to establish electrical connection between said adjacent unit cells.

2. The polymer electrolyte fuel cell according to claim 1, wherein the connection portion is made of a solid vertical bar, traversing a hole in said insulator portion, and two horizontal bars, in connection with said vertical bar, the two horizontal bars extending horizontally from the vertical bar to electrodes of adjacent unit cells.

3. The polymer electrolyte fuel cell according to claim 2, wherein said two horizontal bars do not extend over an entire surface of the electrodes.

4. The polymer electrolyte fuel cell according to claim 1, wherein the connection portion does not cover an entire surface of electrodes of adjacent unit cells.

5. The polymer electrolyte fuel cell according to claim 1, wherein the plurality of unit cells and the insulation portions form a wiring board structure.

* * * * *